US006467054B1

(12) United States Patent
Lenny

(10) Patent No.: US 6,467,054 B1
(45) Date of Patent: Oct. 15, 2002

(54) SELF TEST FOR STORAGE DEVICE

(75) Inventor: Thomas R. Lenny, Longmont, CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/258,858

(22) Filed: Feb. 26, 1999

Related U.S. Application Data

(63) Continuation-in-part of application No. 09/076,300, filed on May 11, 1998, which is a continuation of application No. 08/518,831, filed on Aug. 24, 1995, now Pat. No. 5,761,411, which is a continuation-in-part of application No. 08/404,812, filed on Mar. 13, 1995, now abandoned.

(51) Int. Cl.[7] ............................................. G06F 11/00
(52) U.S. Cl. ...................................... 714/42; 369/53.17
(58) Field of Search .......................... 714/42, 5, 47; 360/31; 369/53.1, 53.17

(56) References Cited

U.S. PATENT DOCUMENTS

| | | | |
|---|---|---|---|
| 3,704,363 A | 11/1972 | Salmassy et al. | 235/153 |
| 4,268,905 A | 5/1981 | Johann et al. | 364/200 |
| 4,348,761 A | 9/1982 | Berger | 371/21 |
| 4,725,968 A | 2/1988 | Baldwin et al. | 364/550 |
| 4,841,389 A | 6/1989 | Hoyt et al. | 360/75 |
| 4,979,055 A * | 12/1990 | Squires | 360/75 |
| 5,067,128 A | 11/1991 | Nakane | 371/5.5 |
| 5,361,346 A * | 11/1994 | Panesar | 714/42 |
| 5,367,670 A | 11/1994 | Ward et al. | 395/575 |
| 5,371,882 A | 12/1994 | Ludlam | 395/575 |
| 5,390,187 A | 2/1995 | Stallmo | 714/7 |
| 5,410,439 A | 4/1995 | Egbert et al. | 360/75 |
| 5,422,890 A | 6/1995 | Klingsporn et al. | 371/21.6 |
| 5,450,579 A | 9/1995 | Johnson | 709/321 |
| 5,469,463 A | 11/1995 | Polich et al. | 395/182.18 |
| 5,471,617 A | 11/1995 | Farrand et al. | 395/700 |
| 5,500,940 A | 3/1996 | Skeie | 395/183.18 |
| 5,539,592 A | 7/1996 | Banks et al. | 360/75 |
| 5,557,183 A | 9/1996 | Bates et al. | 318/434 |
| 5,559,958 A | 9/1996 | Farrand et al. | 395/183.03 |
| 5,566,316 A | 10/1996 | Fechner et al. | 395/182.04 |
| 5,568,608 A | 10/1996 | Shannon | 714/44 |
| 5,611,069 A * | 3/1997 | Matoba | 711/114 |
| 5,617,425 A | 4/1997 | Anderson | 714/10 |
| 5,737,519 A | 4/1998 | Abdelnour et al. | 395/183.15 |
| 5,761,411 A | 6/1998 | Teague et al. | 395/184.01 |
| 5,828,583 A | 10/1998 | Bush et al. | 364/551.01 |
| 5,935,260 A | 8/1999 | Ofer | 714/42 |
| 2001/0042225 A1 * | 11/2001 | Cepulis | 714/25 |

OTHER PUBLICATIONS

Predictive Failure Analysis,: IBM Corporation, believed to be made public Nov. 1994.

Blachek, Michael D. and Iverson, David E.; "Predictive Failure Analysis–Advanced Condition Monitoring," IBM Corporation, believed to be made public Nov. 1994.

Colegrove, Dan; "Informational Exception Condition Reporting," ATA–3 Proposal (X3T10/95–111r1), IBM Corporation; Mar. 1, 1995.

* cited by examiner

*Primary Examiner*—Robert Beausoleil
*Assistant Examiner*—Bryce P. Bonzo
(74) *Attorney, Agent, or Firm*—Sharp, Comfort & Merrett, P.C.

(57) ABSTRACT

A storage device capable of performing diagnostics tests on itself to render an opinion of its health to a host computer is disclosed. Test commands are received over an industry-standard interface. The tests may be run in off-line or captive modes. Off-line tests are subject to interruption from the host computer whereas captive tests are not. Unless a command is received that instructs the storage device to stop testing or power-down, the storage device suspends the test, executes the host command and resumes testing. Power management is disabled while the tests are run to prevent the storage device from inadvertently powering down. A number of specific tests may be performed, including a general quick test and a comprehensive test. Failures detected during the tests are logged in a non-volatile memory of the storage device and include an indication of which component failed and at which point in the test that component failed.

36 Claims, 9 Drawing Sheets

FIG. 3

| | DRIVE ATTRIBUTE DATA STRUCTURE | | | | |
|---|---|---|---|---|---|
| BYTE | DESCRIPTION | BYTES | FORMAT | HOST TYPE | DEVICE TYPE |
| 0-1 | DATA STRUCTURE REVISION NUMBER | 2 | | | R/W |
| 2 | 1ST DRIVE ATTRIBUTE | 12 | | | R/W |
| 14 | : | 12 | | | R/W |
| 26 | : | 12 | | | R/W |
| | : | | | | R/W |
| 350 | 30TH DRIVE ATTRIBUTE | 12 | | | R/W |
| 362 | OFF-LINE DATA COLLECTION STATUS | 1 | | | R/W |
| 363 | SELF-TEST EXECUTION STATUS BYTE | 1 | | RD ONLY | R/W |
| 364-365 | TOTAL TIME IN SECONDS TO COMPLETE OFF-LINE DATA | 2 | | | R/W |
| 366 | VENDOR SPECIFIC | 1 | | | R/W |
| 367 | OFF-LINE DATA COLLECTION CAPABILITY | 1 | BINARY | RD ONLY | R/W |
| 368 | DRIVE FAILURE PREDICTION CAPABILITY | 2 | | | R/W |
| 370 | S.M.A.R.T. DRIVE ERROR LOGGING CAPABILITY | 1 | | | R/W |
| 371 | SELF-TEST FAILURE CHECKPOINT | 1 | | RD ONLY | R/W |
| 372 | SELF-TEST NUMBER 1 COMPLETION TIME | 1 | BINARY | RD ONLY | R/W |
| 373 | SELF-TEST NUMBER 2 COMPLETION TIME | 1 | BINARY | RD ONLY | R/W |
| 374 | RESERVED (0x00) | 12 | | | |
| 386 | VENDOR SPECIFIC | 125 | | | R/W |
| 511 | DATA STRUCTURE CHECKSUM | 1 | | | R/W |
| TOTAL BYTES | | 512 | | | |

FIG. 4

| | DESCRIPTION | BYTES | FORMAT | HOST TYPE |
|---|---|---|---|---|
| 54 | ATTRIBUTE ID NO. | 1 | BINARY | RD ONLY |
| 56 | STATUS FLAGS | 2 | BIT FLAGS | RD ONLY |
| 56-1 | PRE-FAILURE WARRANTY | | | |
| 56-2 | ON-LINE COLLECTION | | | |
| 56-3 | PERF. ATTRIBUTE TYPE | | | |
| 56-4 | ERROR RATE ATTRIBUTE TYPE | | | |
| 56-5 | EVENT COUNT ATTRIBUTE TYPE | | | |
| 56-6 | SELF-PRESERVING ATTRIBUTE TYPE | | | |
| 56-7 | RESERVED | | | |
| 58 | NORMALIZED ATTRIBUTE VALUE | 1 | BINARY | RD ONLY |
| 60 | WORST EVER NORMALIZED ATTRIBUTE VALUE | 1 | BINARY | RD ONLY |
| 62 | RAW ATTRIBUTE VALUE | 6 | BINARY | RD ONLY |
| 64 | RESERVED | 1 | | RD ONLY |
| | TOTAL BYTES | 12 | | |

FIG. 5

| | DESCRIPTION | BYTES | FORMAT | TYPE |
|---|---|---|---|---|
| 68 | DATA STRUCTURE REV. NO. | 2 | BINARY | RD ONLY |
| 70-1 | 1ST DRIVE THRESHOLD | 12 | BINARY | RD/WRT |
| | ⋮ | " | " | " |
| | ⋮ | " | " | " |
| 70-30 | 30TH DRIVE THRESHOLD | 12 | BINARY | RD/WRT |
| 72 | RESERVED | 100 | | RD/WRT |
| 74 | VENDOR UNIQUE | 49 | | RD ONLY |
| 76 | DATA STRUCTURE CHECKSUM | 1 | | RD ONLY |
| | TOTAL BYTES | 512 | | |

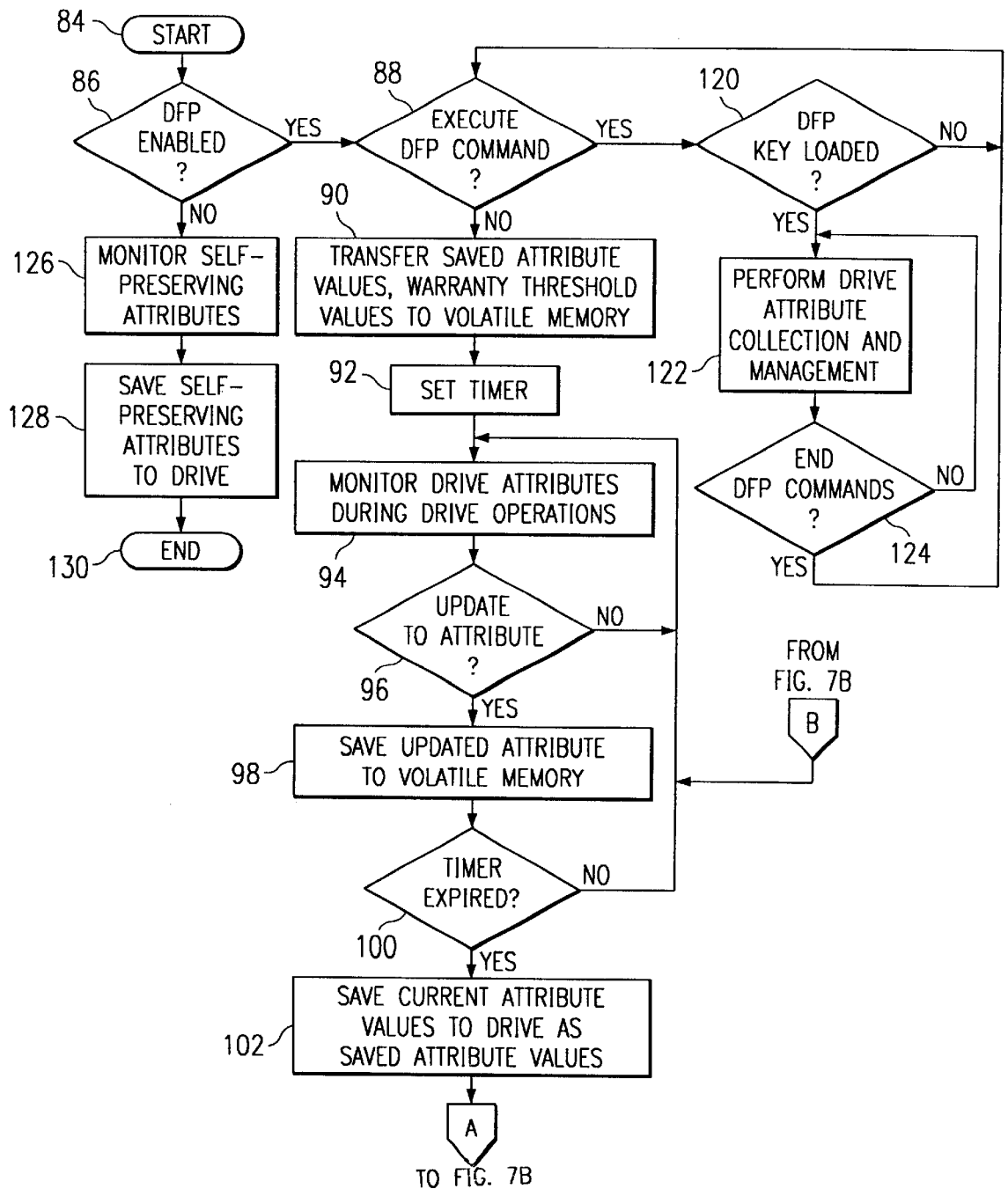

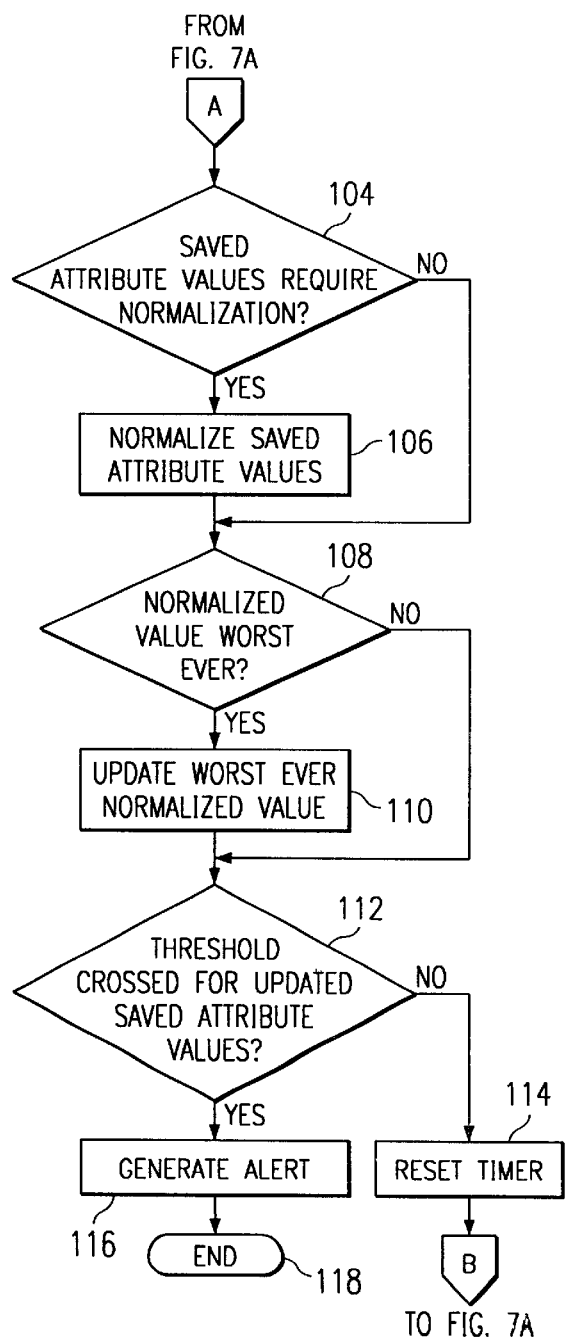
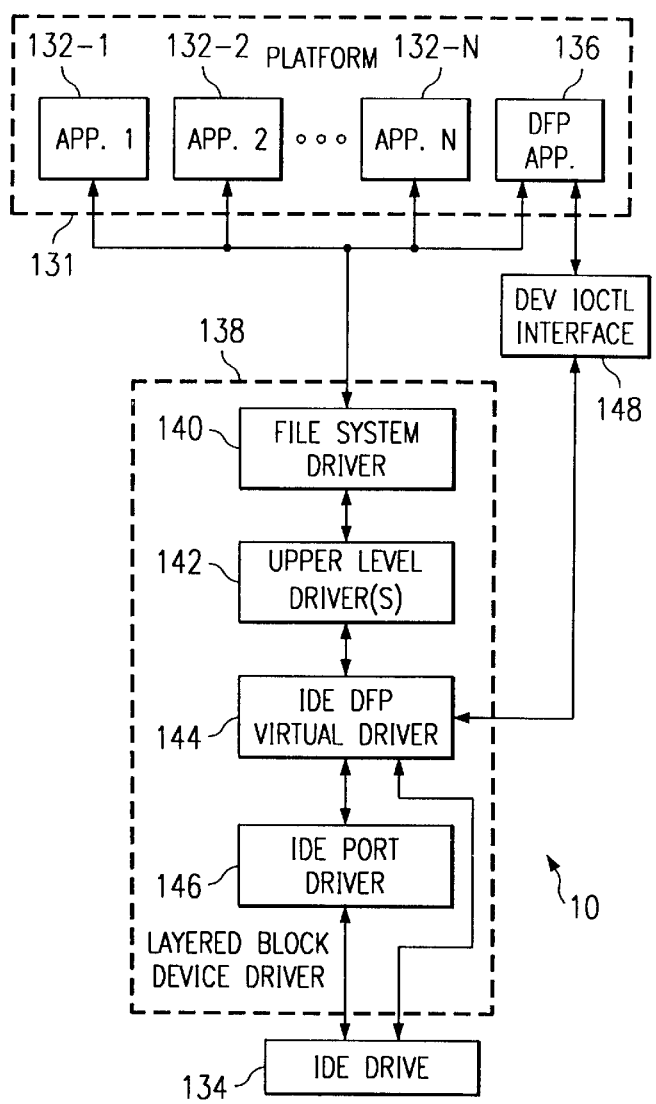

| LOG SECTOR ADDRESS | DESCRIPTION | HOST TYPE | DEVICE TYPE |
|---|---|---|---|
| 00h | RESERVED | TBD | |
| 01h | SMART ERROR LOG | READ ONLY | R/W |
| 02h-05h | RESERVED FOR SMART ERROR LOG | READ ONLY | R/W |
| 06h | SMART SELF-TEST LOG | READ ONLY | R/W |
| 07h-07Fh | RESERVED | TBD | |
| 80h-9Fh | HOST VENDOR SPECIFIC | READ/WRITE | |
| A0h-BFh | DEVICE VENDOR SPECIFIC | VENDOR | R/W |
| C0h-FFh | RESERVED | TBD | |
| TBD-SECTOR IS RESERVED AND READ/WRITE STATUS IS UNDEFINED | | | |

| BYTE | DESCRIPTION |
|---|---|
| 0-1 | DATA STRUCTURE REVISION NUMBER |
| 2-25 | 1ST DESCRIPTOR ENTRY |
| 26-481 | ... |
| 482-505 | 21ST DESCRIPTOR ENTRY |
| 506-507 | VENDOR SPECIFIC |
| 508 | SELF-TEST DESCRIPTOR INDEX POINTER |
| 509-510 | RESERVED |
| 511 | CHECKSUM |

| BYTE | DESCRIPTION |
|---|---|
| 1 | SELF-TEST NUMBER |
| 2 | SELF-TEST EXECUTION STATUS |
| 3-4 | LIFE TIME POWER ON HOURS |
| 5 | SELF-TEST FAILURE CHECKPOINT |
| 6-9 | LBA OF 1ST FAILURE |
| 10-24 | VENDOR SPECIFIC BYTES |

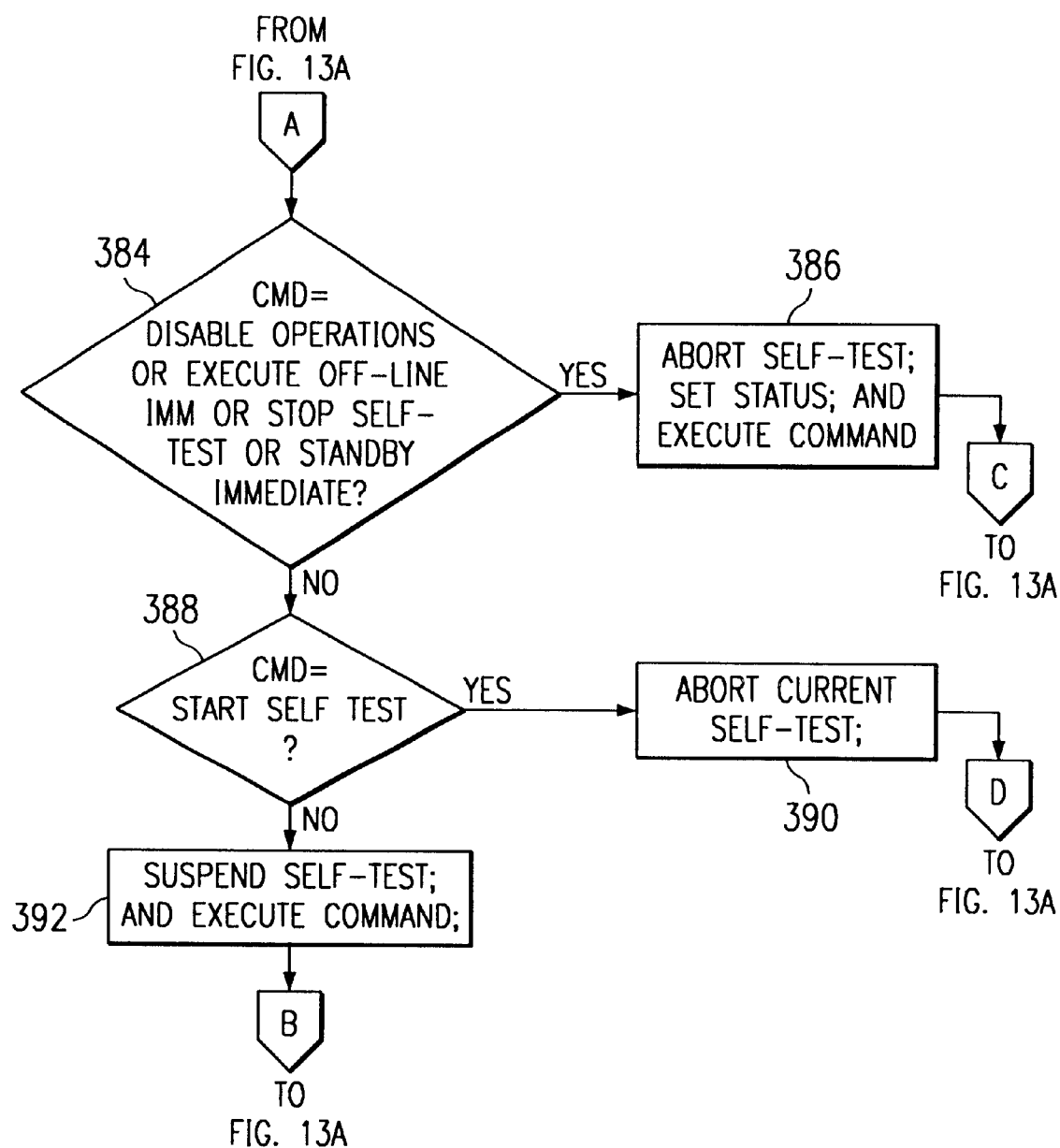

SELF TEST FOR STORAGE DEVICE

CROSS REFERENCE TO RELATED APPLICATIONS

This application is a continuation in part of U.S. patent application Ser. No. 09/076,300 filed May 11, 1998, which is a continuation of Ser. No. 08/518,831, now U.S. Pat. No. 5,761,411 filed Aug. 24, 1995, which is a continuation-in-part of U.S. Pat. No. 08/404,812 filed Mar. 13, 1995, now abandoned, all assigned to the Assignee of the present application and hereby incorporated by reference as if reproduced in its entirety.

This application is also related to U.S. patent application Ser. No. 09/259,393 entitled "Background Read Scanning with Reallocation" and U.S. patent application Ser. No. 09/259,622, entitled "Error Logging", both of which were filed concurrently herewith, and U.S. Pat. No. 5,761,411, all assigned to the Assignee of the present application and hereby incorporated by reference as if reproduced in their entirety.

This application is also related to U.S. Pat. No. 5,828,583, which is a continuation of U.S. patent application Ser. No. 08/404,812 filed Mar. 13, 1995 entitled "Drive Failure Prediction Techniques for ATA Disk Drives", now abandoned, all of which are hereby incorporated by reference herein.

BACKGROUND OF THE INVENTION

1. Field of the Invention

The present invention generally relates to self-test techniques for storage devices and, more particularly, relates to a method for performing a variety of self-tests, storing and maintaining results and providing said results to host computer.

2. Description of Related Art

The vast majority of personal computer (or "PC") systems available today come equipped with a peripheral storage device such as a hard disk drive, compact disk read-only-memory (CD-ROM), digital versatile disk (DVD) or floppy disk. These storage devices often comply with certain industry interface standards, such as ATA, integrated drive electronics (IDE), small computer systems interface (SCSI), Single Connector Attachment (SCA) or institute of electrical and electronic engineers (I.E.E.E.) 1394 bus.

Because the storage devices contain components that are subject to defects, testing is a large part of the manufacturing process for a storage device. Typically, after the storage device is manufactured it is powered on for certification testing and burn-in. A tester may also be connected to the storage device to receive test information from the storage device.

In the case of some storage devices, the certification tests are initiated based on a bit in software that is recognized when the storage device is powered up for the first time. The certification tests include an extensive set of proprietary read, write and servo tests and may vary by manufacturer. Upon completion of the tests, the storage device will provide a pass/fail indication, and possibly, and other test result information.

In the case of some storage device, a visible indication may be present on the storage device to indicate pass/fail. In the case of other storage device manufacturers, the test results are provided by the storage device to the tester over a proprietary serial cable. The same interface may be used during post failure analysis where the storage device receives test commands from the tester to determine the cause of a failure. In any event, the initial test results may be saved in a proprietary log on the storage device. The proprietary log is generally not available except at the factory.

If a failure is detected, the storage device may be repaired or rejected depending on the defect. For example, a single sector failure is typically marked as "bad" without rendering the drive otherwise perfectly satisfactory for sale. However, a motor instability problem that shows up during read/write tests may render the drive inoperable.

Testing is also a part of assembling a larger machine in which the storage device is a component, such as a computer or laser printer. Once the machine is assembled with the storage device, a battery of operations may be run on the machine to give the storage device a final checkout. If the storage device fails at this point, it is typically replaced and set aside for more tests, or sent back to the storage device manufacturer.

One such factory assembly test is Compaq's Diagnostics for Windows (DFW) software. This software tests many components of a computer system, including storage devices. In addition to its factory use, DFW is available for end-users to test their computer. The software is particularly helpful for telephone support calls.

DFW operates from a host computer or surrogate computer to perform tests on the storage device, such as cable tests and read scans. The host computer provides a series of basic low level instructions to the storage device, which together form a specific test. Upon completion of the low-level instructions, the host computer may read the status and error registers to determine if the low-level instruction completed successfully. Since DFW must work with a wide variety of storage devices from different manufacturers, the low-level instructions must be common to all storage devices. Therefore, the type of tests that can be developed is somewhat limited. Furthermore, while DFW is easily adaptable to work with a wide variety of storage devices and tests, it is relatively slow at performing the tests since each test must be constructed from low level instructions and run from the surrogate computer. Thus, a standardized way of communicating test operations to a storage device, which would be capable of performing the test operations and logging the results itself, is desirable.

SUMMARY OF THE INVENTION

According to a preferred embodiment, a method of testing a storage device having an industry-standard interface, components and a non-volatile memory includes receiving a test command from a host computer and performing a test on one or more of the components. If a failure is detected, the storage device identifies the failed component and a corresponding segment of the test where the component failed, i.e., failure checkpoint, for storage in the non-volatile memory. Test results are provided to the host computer including, if a failure is detected, the failed component identification and the failure checkpoint.

The tests can be performed in an off-line or captive mode. In captive mode, the test is not subject to interruption by the host computer. A busy flag is set to indicate to the host computer that the storage device is busy. Power management is preferably disabled before performing the self-tests, and is re-enabled after performing the tests. The self-tests may include a number of component specific tests or general tests, such as a quick test and a comprehensive test.

If the test should be performed in off-line mode the method further includes monitoring for a new command from the host computer while performing the test, aborting the test if the new command indicates some form of stoppage or re-initialization, and aborting the test and starting a new test if the new command is a start self-test command. Otherwise, suspending the test, executing the new command after suspension and resuming the test after servicing the host computer.

The self-tests includes a variety of tests designed to test components of the storage device and overall health of the device, such as write tests, servo tests and read scan tests. The results of the tests are stored in the non-volatile memory and may include a test number, status indication, system configuration information, a pointer to the latest test results and a checksum.

In another embodiment, a storage device includes an industry-standard interface, a non-volatile memory and a controller coupled to the non-volatile memory that is operable to receive a test command from a host computer. In response to the test command, the controller is operable to perform one or more self-tests to test components of the storage device, detect failures of the components, and store results of the tests in a logging descriptor of the non-volatile memory. A certain number of descriptors are maintained in the non-volatile memory with the most recent descriptor being pointed to by an index pointer. When a failure is detected in the storage device, the results logged into the descriptor include a failed component identification and a failure checkpoint.

In another embodiment, a computer system includes a central processing unit coupled to a storage device. The storage device includes an industry-standard interface, a non-volatile memory and a controller coupled to the non-volatile memory that is operable to receive a test command from the central processing unit. In response to the test command, the controller is operable to perform one or more self-tests to test components of the storage device, detect failures of the components, and store results of the tests in the non-volatile memory. If a failure is detected, the results include a failed component indicator, a failure checkpoint and system configuration information.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 3 is a block diagram of a data structure for a drive attribute values sector of the storage device of FIG. 1;

FIG. 4 is a block diagram of a data structure for a drive attribute value of the drive attribute values sector of FIG. 3;

FIG. 5 is a block diagram of a data structure for the warranty failure thresholds sector of the storage device of FIG. 1;

FIG. 6 is a block diagram of a data structure for a warranty failure threshold of the warranty failure thresholds sector of FIG. 5;

FIGS. 7A–B is a flow chart of a method for predicting an imminent failure of a storage device, such as an ATA disk drive;

FIG. 8 is a block diagram of the interface between a DFP application and an IDE drive;

FIG. 11 is a block diagram of a data structure of the self-test log sector of FIG. 10;

FIG. 12 is a block diagram of a data structure of one of the descriptor entries of FIG. 11; and FIGS. 13A and 13B is a flow chart of a method for performing self-tests on the storage device of FIG. 1.

DESCRIPTION OF ILLUSTRATIVE EMBODIMENTS

Figure 1:
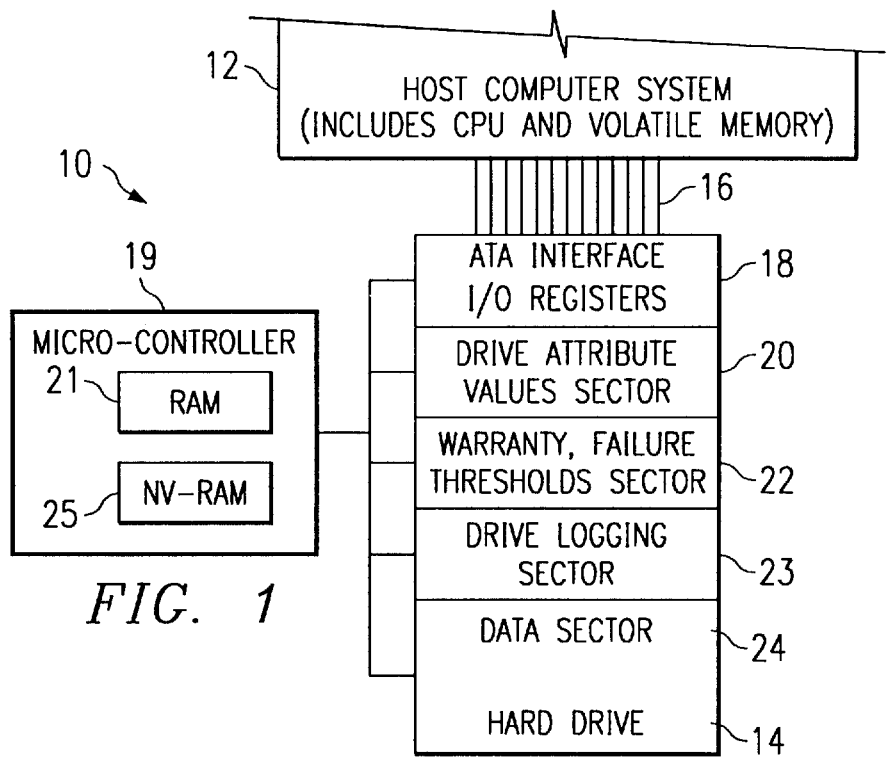
FIG. 1 is a block diagram of a host computer system constructed in accordance with the teachings of the present invention.

Referring now to FIG. 1, a computer system 10, for example, a personal computer (or "PC") system, configured for performing diagnostic self-tests of a storage device 14, for example, a hard disk drive, coupled thereto will now be described in greater detail. As is conventional in the art, the computer system 10 includes a host computer 12, which includes a central processing unit (or "CPU") and a volatile memory such as a random access memory (or "RAM"). The host computer 12 is coupled to the storage device 14 by a physical interface 16, for example a 40-pin connector. The storage device 14 preferably has an IDE interface, but other industry-standard interfaces and protocols such as SCSI, IEEE 1394, fiber-channel and SCA may also be used. The storage device 14 is preferably a hard disk drive, but a CD_ROM, a DVD, floppy disk or other storage media may use the principles disclosed herein.

According to the preferred embodiment, the storage device 14 is comprised of an AT attachment (or "ATA") interface input/output (or "I/O") registers 18 through which communication to or from the storage device 14 is routed, a drive attribute values sector 20 in which drive attributes considered to be key leading indicators of impending failures of the storage device 14 are periodically stored, a warranty failure thresholds sector 22 in which limits for each drive attribute value, above which the storage device 14 is deemed to have failed even though it may still be operational, are stored, and data sector 24 in which other information may be stored for later retrieval.

A controller 19 is coupled to the I/O registers 18, and the drive sectors 20, 22, 23 and 24 to control the operation of the storage device 14, service commands from the host computer 12, execute diagnostic self-tests and provide results back to the host 12. The controller 19 may include a volatile memory 21 for program execution and a non-volatile memory 25, such as Flash electrically erasable read-only memory or the like, to use as an alternative to the drive attribute, warranty failure and drive error logging sectors. The non-volatile memory 25 is particularly useful for read-only media, such as non-writable CD-ROM and DVD.

Figure 2:
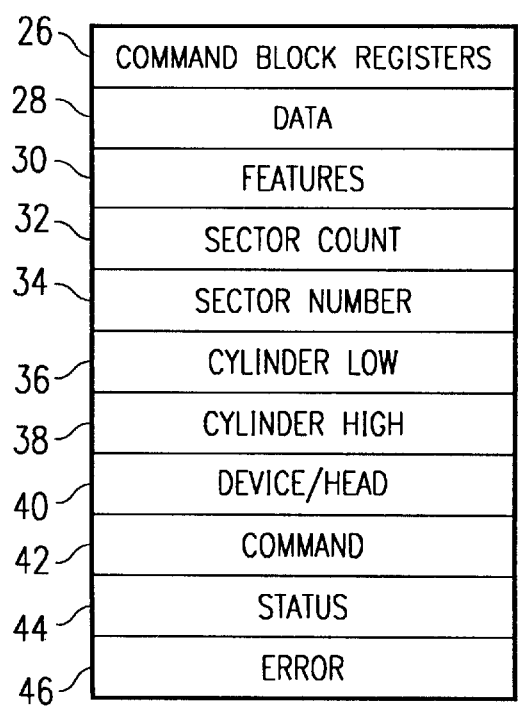
FIG. 2 is a block diagram of a command block register portion of the ATA interface I/O registers of the storage device of FIG. 1.

Referring next to FIG. 2, command block registers 26, which form a portion of the ATA interface I/O registers 18, will now be described in greater detail. Data register 28, which may be either 8-bits or 16-bits wide, holds data being transferred between the host computer 12 and the storage device 14 during either a read operation or a write operation. Features register 30 is command specific and may be used to enable and disable features of the ATA interface. Sector count register 32 contains the number of sectors of data to be transferred during a read operation or a write operation between the host computer 12 and the storage device 14. Sector number register 34 contains a starting sector number for a cylinder-head-sector (or "CHS") mode access of the storage device 14. Cylinder low register 36 contains the lower order bits of a starting cylinder address for a CHS mode access of the storage device 14. Cylinder high register 38 contains the high order bits of the starting cylinder address for a CHS mode access of the storage device 14. Device/head register 40 contains device addressing and sector addressing information for accesses of the storage device 14. Command register 42 holds command code being transferred to the storage device 14 by the host computer 12. Status register 44 is a register that displays information pertaining to the current status of the storage device 14, such as when the storage device 14 is busy ("BSY" bit) and when an error occurred during execution of the previous command error ("ERR" bit). Finally, error register 46 is a register that provides information pertaining to the current error condition of the storage device 14, such as when a requested command has been command aborted ("ABRT" bit) such as when the command code or a command parameter is invalid or some other error has occurred.

The detailed mechanism by which the aforementioned command block registers 26 are utilized to perform read or write operations between the host computer 12 and the storage device 14 is well known in the art and need not be described in greater detail. However, to perform drive failure prediction management operations in accordance with the teachings of the present invention, an execute drive failure prediction command must be issued to the storage device 14. To eliminate inadvertent or unauthorized access to drive failure prediction management operations, the execute drive failure prediction command will be aborted unless a key has been loaded into the cylinder low and cylinder high registers 36 and 38. More specifically, prior to writing the execute drive failure prediction command 0xB0 to the command register 42, key codes 0x4F and 0xC2 must be respectively loaded into the cylinder low and cylinder high registers 36 and 38. As the aforementioned key codes do not correspond to any cylinder address for the storage device 14, the storage device 14 will not misinterpret the key codes as a cylinder address for the storage device 14. Upon receipt of the key codes and the execute drive failure prediction command, the storage device 14 will execute the command function contained in the features register 30.

The command functions which may be performed during drive failure prediction management operations and the function code which must be placed in the features register 30 for the function to be executed are set forth in Table I, below.

TABLE 1

| Code | Command Function |
|------|------------------|
| 0xD0 | "Return Drive Attribute Values" |
| 0xD1 | "Read Warranty Failure Thresholds" |
| 0xD2 | Reserved |
| 0xD3 | "Write current attribute values to disk" |
| 0xD4 | "Execute Off-Line Immediate" |
| 0xD5 | "Read drive logging sectors" |
| 0xD6 | "Write drive logging sectors" |
| 0xD7 | "Write Warranty failure thresholds" |
| 0xD8 | "Enable failure prediction operations" |
| 0xD9 | "Disable failure prediction operations" |
| 0xDA | Reserved |
| . | . |
| . | . |
| . | . |
| 0xDF | Reserved |

Upon receipt of the "Return Drive Attribute Values" command, the current drive attribute values stored in volatile memory are transferred from the host computer 12 to the storage device 14 where they are stored in the drive attributes values sector 20 as saved attribute values. Upon receipt of the "Read Warranty Failure Thresholds" commands, the values of warranty failure thresholds stored in the warranty failure thresholds sector 22 of the storage device 14 are transferred to the volatile memory of the host computer system 12. Upon receipt of the "Write Current Attribute Values To Disk" command, the current attribute values contained in the volatile memory of the host computer 12 are stored in the drive attribute values sector of the storage device 14 as saved attribute values.

Upon receipt of the "Execute Off-Line Immediate" command, the storage device 14 will immediately initiate a set of test activities, such as data collection for drive failure prediction or self-tests. When the test activity is complete, the results are saved to the device's non-volatile memory, i.e., drive logging sector 14. Table II below lists the various test activities possible according to a subcommand written to the sector number register 34. The test activities may be performed on-line, off-line or in a captive mode according to the type of test activity. Data which may be collected without interfering with the normal operations of the storage device 14 is collected on-line. Data collection which would interfere with the normal operations of the storage device 14 is collected off-line or in captive mode.

Upon receipt of the "Read Drive Logging Sectors" command, the contents of the drive logging sector 23 may be read. Stored in the drive logging sector 23 is historical information regarding the operation of the storage device 14. Logging information which may be stored in the drive logging sector 23 may include counts and statistics maintained by the storage device 14, for example, total number of sectors reads, total number of sector writes, total number of seeks, seek length histograms, request size histograms and others.

It is contemplated that an analysis of the logging information stored in the drive logging sector 23, together with the attribute values stored in the drive attribute values sector 20, can place an imminent drive failure prediction into context, i.e. identify if the prediction of a drive failure was, in fact, caused by an imminent failure of the drive. For example, if an imminent drive failure prediction was issued due to the value of the sector read error rate attribute crossing the warranty failure threshold for that attribute, a review of the logging information stored in the drive logging sector 23 may indicate that the imminent drive failure prediction was preceded by an unusually high number of sector reads. Such an occurrence would suggest that it was the heavy usage of the storage device 14, and not an erroneous operation of the storage device 14 itself, which triggered the prediction of an imminent drive failure.

Upon receipt of the "Write Drive Logging Sectors" command, the storage device 14 will prepare for the receipt of 512 bytes of data to be written to the drive logging sector 23 via the data register 28. It is contemplated that the "Write Drive Logging Sectors" command will be used as a debug tool to verify proper operation of the other execute drive failure prediction command functions.

Warranty failure threshold values may be updated using the "Write Warranty Failure Thresholds" command. Specifically, upon receipt of the "Write Warranty Failure Thresholds" command, the storage device 14 will prepare for the receipt of 512 bytes of data to be written to the warranty failure thresholds sector 22, via the data register 28, to overwrite the prior contents of the warranty failure thresholds sector 22.

Finally, drive failure prediction may be selectively enabled or disabled by respectively issuing the "Enable Failure Prediction Operations" or the "Disable Failure Prediction Operations" commands. When drive failure prediction is disabled, drive attributes are neither monitored nor updated. The state of the enable/disable failure prediction flags are preserved by the storage device 14 across power cycles, thereby preventing a power down or power up from inadvertently enabling or disabling failure prediction operations.

The test activities which may be performed during drive failure prediction management operations and self-test operations are listed below in Table II according to their corresponding test number that must be placed in the sector number register 34 for the test to be executed. An upper bit of the sector number register 34 indicates whether the test should be performed in captive mode.

TABLE II

| Test Number | Test Name |
| --- | --- |
| 0 | Off-line Data Collection |
| 1 | Quick test in off-line mode |
| 2 | Comprehensive test in off-line mode |
| 3–63 | Reserved |
| 64–126 | Vendor specific |
| 127 | Abort Self-test |
| 128 | Reserved |
| 129 | Quick test in captive mode |
| 130 | Comprehensive test in captive mode |
| 131–191 | Reserved |
| 192–255 | Vendor specific |

Test number 0 corresponds to a "Off-Line Data Collection" subcommand which causes the storage device 14 to collect drive attribute data for the purpose of predicting drive failure. Attribute data, which is useful to drive failure prediction, is either collected on-line, i.e., during normal operations of the storage device 14 or off-line, i.e. after interrupting normal operations of the storage device 14. Data which may be collected without interfering with the normal operations of the storage device 14 is collected online. Data collection which would interfere with the normal operations of the storage device 14 is collected off-line. On-line data collection is described in greater detail with respect to FIGS. 7A–B, below. Data which should be collected off-line includes selected performance and drive functionality tests such as sequentially scanning the entire disk for defects, measuring the read error rate, the read channel margin or the seek error rate, or performing the data throughput test. To perform test number 0, the "Execute Off-Line Immediate" command must first be placed in the features register 30 and the "Off-Line Data Collection" subcommand in the sector number register 34.

In alternate embodiments, off-line data collection initiated by the "Execute Off-Line Immediate" may be accomplished in any one of three possible methods which primarily differ according to how many times the "Execute Off-Line Immediate" must be issued. The first method requires the issuance of only a single "Execute Off-Line Immediate" command. In accordance with this method of off-line data collection, off-line data collection is segmented as a single segment, off-line task to be performed as a background task. If interrupted by another command, off-line data collection is suspended until the interrupting command is completed. Off-line data collection will then resume. The second method requires the issuance of multiple "Execute Off-Line Immediate" commands. In accordance with this method of off-line data collection, off-line data collection is segmented as a multiple segment, off-line task to be performed as a background task. If interrupted by another command, off-line data collection is suspended until the interrupting command is complete. Off-line data collection will then resume until the interrupted segment is completed. To proceed with the next segment of off-line data collection, a separate "Execute Off-Line Immediate" command must be issued.

The third and final method for off-line collection is to segment off-line data collection as either a single or a multiple segment off-line task that is performed as a foreground task and cannot be performed as a background task. If interrupted by another command, this method may either complete the current segment and execute the interrupting command, save its off-line processing state and execute the interrupting command or abort the current off-line segment and execute the interrupting command. After completing the interrupting command, off-line data collection will not resume until another "Execute Off-Line Immediate" command is received.

Tests 1, 2, 129 and 130 correspond to self-test activities. To perform any of these tests, the "Execute Off-Line Immediate" command must first be placed in the features register 30 and the self-test subcommand in the sector number register 34. This is also referred to as a "Start Self-Test" command. It is particularly advantageous to perform self-tests operations on the storage device and through the industry-standard interface. This provides a known, stable interface and protocol while allowing the actual self-test operations to evolve and mature without requiring changes to the interface, protocol or legacy software. For example, as new storage devices are developed, new self-tests can be created to address any special needs of the new storage devices. These new self-tests can then be incorporated into the storage devices without requiring any additional changes to interface software. They would simply be included into one of the tests of Table II.

Self-tests can be performed in two different modes—off-line and captive mode. In off-line mode, any power management operations by the storage device 14 are postponed until the self-test completes. For example, if the storage device 14 includes a power-down timer that is pre-set to power down the storage device 14 after a certain number of minutes of inactivity, the potential power down event is postponed until the self-test completes. Once the test is complete, the storage device 14 may power down. If a Standby Immediate command is received by the storage device 14 between the expiration of the power-down timer and the completion of the self-test, the storage device 14 will power down to a standby condition. Afterwards, upon receipt of a command, such as a read command, that causes the storage device 14 to exit the power down state, the storage device will preferably not resume self-test activities.

In captive mode, any commands or power down events as a result of the power-down timer will preferably not cause the storage device 14 to enter a powered down state. Upon completion of the captive mode self-test, the power down timer is reset.

Test number 1 corresponds to a "Quick Test in Off-Line Mode" subcommand which causes the storage device 14 to perform a quick series of diagnostic self-tests and save the test results in a non-volatile memory of the storage device 14, i.e., drive logging sector 23. The self-tests may include write tests, servo tests and read scan tests. Any component of the storage device 14 that is capable of being tested may be included, such as the platter, the read/write head, drive motor, servo, electronics and drive volatile memory. The write test may write a worst case data pattern to an unused portion, preferably non-user accessible portion, of the storage device 14 on each physical head. Data patterns may include alternating ones and zeros, rotating ones or zeros, random patterns and other patterns suitable for detecting errors. After each write the sector is read to determine if any errors are present. The servo test may include tests directed at detecting servo related problems, such as run out, disk shift and servo stability. The read scan test causes the drive attributes to be updated in the drive attributes sector 20. Included in the results are a pass/fail indication, time stamp and system configuration of the host software. These self-tests allow the storage device 14 to determine the general functionality of itself.

Test number 2 corresponds to a "Comprehensive Test in Off-Line Mode" subcommand which causes the storage device 14 to perform a comprehensive series of diagnostic self-tests and save the test results in a non-volatile memory of the storage device 14, i.e., drive logging sector 23. The comprehensive self-tests-may include the same tests as the quick tests, but the comprehensive test is not time limited. For example, in quick mode the read scan test may check less than 3% of the storage device 14. In comprehensive mode, a complete read scan test is performed. Therefore, the complete functionality of the drive can be determined. Preferably the quick test is performed in less than two minutes while the comprehensive test may take much longer.

Test numbers 3–63 and 131–191 are reserved for future use. Test numbers 64–126 and 192–255 are vendor specific.

Test number 127 corresponds to an "Abort Self-Test" subcommand or "Stop Self-Test" command which causes the storage device 14 to abort or terminate the current self-test activity when in off-line mode. It is noted that a soft reset command may be used to stop self-test activities regardless of mode.

Test number 129 corresponds to a "Quick Test in Captive Mode" subcommand which causes the storage device 14 to perform the quick test in captive mode, i.e. without interruption from the host. The test activities of test number 129 are similar to the test activities of test number 1, except they are not subject to interruption by the host 12.

Test number 130 corresponds to a "Comprehensive Test in Captive Mode" subcommand which causes the storage device 14 to perform a comprehensive test in captive mode. The test activities of test number 130 are similar to the test activities of test number 2, except they are not subject to interruption by the host 12.

In captive mode, the storage device 14 sets the "BSY" flag in the status register 44 when the captive mode test activities begin so that the host 12 does not interrupt the test. When complete, the storage device 14 clears the "BSY" flag and asserts an interrupt to the host 12 to indicate the self-test has been completed.

Referring next to FIG. 3, the data structure for the drive attribute values sector 20 in which the saved values for the drive attributes are stored may now be seen. The drive attribute values sector includes a data structure revision number 200 which identifies the version of the data structure implemented in the drive attribute values sector 20. Initially, the data structure revision number 200 will be set to 0x00010 and incremented by one for each new revision. The drive attribute values sector further includes thirty drive attributes 202-1 through 202-30, each of which will contain a saved value for a particular attribute if such attribute is supported by the storage device 14. Preferably, attributes supported by the storage device 14 should all be concatenated together directly after the data structure revision number 200. Attributes, which are not supported by the storage device 14, are not included, leaving that portion of the data structure blank, i.e. set to 0x00. An off-line data collection status byte 204 is provided. An self-test execution status byte 206 is used to report the status of the self-test activities, including percent of time remaining for the self-test, component failure and self-test execution status while the test is being run. The component failure indication is useful to help identify the failure, for example, while a specific servo test may pass, a write test may uncover a servo element failure. Possible values for the self-test execution status are listed in Table III.

TABLE III

| Self Test Execution Values | Self-Test Status Description |
| --- | --- |
| 0 | Self-test routines completed without error or has never been run |
| 1 | Self-test routines stopped by host |
| 2 | Self-test routines interrupted by host with hard or soft reset |
| 3 | Can't execute self-test routines |
| 4 | Self-test routines completed with unknown failure |
| 5 | Self-test completed with write or electrical element failure |
| 6 | Self-test completed with servo element failure |
| 7 | Self-test completed with read element failure |
| 8 . . . 14 | Reserved |
| 15 | Self-test routines in progress |

A total time in seconds to complete off-line data collection word 208 is provided to help with time estimation during data collection. An off-line data collection capability byte 210 indicates whether the storage device 14 is capable of performing off-line data collection, including the "Execute Off-Line Immediate" command, an enable/disable automatic off-line data collection feature, an abort/restart off-line by host feature, the off-line read scanning function, and the self-test functions. A drive failure prediction capability word 212 is provided to indicate the particular drive failure capabilities of the storage device 14. A drive error logging capability byte 214 is provided to indicate type of error logging supported by the storage device 14. A self-test failure checkpoint byte 216 is provided to track the storage device's unique checkpoint when previous self-test failed. The checkpoint identifies a particular execution section of the self-test that previously resulted in a failure. For example, a test may be logically divided into many segments, each segment testing a particular aspect of the storage device 14 or component. The checkpoint would identify the segment running when the failure occurred. This allows the tests to be re-run without starting at the beginning and helps to identify the actual source of the failure. The checkpoint is also useful when combined with the execution status byte 322. The storage device 14 updates this byte when a failure is detected. A self-test numbers 1 and 2 completion time bytes 218 and 220 are provided to indicate the optimal time in minutes for the test to complete. The storage device 14 vendor preferably initializes these values based on their estimation of completion time. Test number 1 preferably corresponds to the quick test and test number 2 preferably corresponds to the comprehensive test. Finally, the drive attribute values sector 20 includes a region 222 reserved for future attributes, a region 224 reserved for attributes unique to a single vendor and a checksum 226 for detecting errors during a write to the drive attribute values sector 20.

Referring next to FIG. 4, the data structure for a drive attribute will now be described in greater detail. Attribute identification number (or "ID No.") region 54 uniquely identifies each attribute 202-1 through 202-30. Status flags region 56 includes a collection of bit flags which contain information regarding each particular attribute. Pre-failure warranty bit 56-1 identifies whether a particular failure identified by the attribute 202-N is covered under a warranty offered by the drive manufacturer. If the pre-failure warranty bit 56-1 is set to 0, a failure indicated by the value of the attribute 202-N exceeding the threshold value does not constitute a failure covered under the drive warranty. If, however, the pre-failure warranty bit 56-1 is set to 1, a failure indicated by the value of the attribute 202-N exceeding the threshold value constitutes a failure covered under the drive warranty.

On-line collection bit 56-2 indicates when the attribute 202-N is updated. If the on-line collection bit 56-2 is set to 0, the attribute 202-N is updated only during off-line testing. If, however, the on-line collection bit 56-2 is set to 1, the attribute 202-N is either updated only during on-line testing or during both on-line and off-line testing.

As previously set forth, the attribute 202-N may be either a performance, error rate or event count attribute. If the attribute 202-N is a performance attribute, performance attribute bit 56-3 is set to 1 and error rate and event count bits 56-4 and 56-5 are set to 0. Conversely, if the attribute 202-N is an error rate attribute, only the error rate bit 56-4 is set to 1 and if the attribute 202-N is an event count attribute, only the event count bit 56-5 is set to 1.

Self preserving attribute bit 56-6 indicates that the attribute 202-N is an attribute for which information is collected and saved even if drive failure prediction is disabled. Attributes are designated as self-preserving if such attributes will have more validity when always collected. For example, start/stop count is a self-preserving attribute. Finally, the remaining status flag bits 56-7 are reserved for future uses.

The data structure of the attribute 202-N maintains three values of the attribute. The raw value of the attribute is maintained in raw attribute value byte 62. The normalized value of the attribute 202-N is maintained in normalized attribute value byte 58. Finally, as both performance and error rate attributes are reversible-type attributes, i.e. may either worsen or improve over any given period of time, the worst ever normalized value of the attribute 202-N is maintained in worst ever normalized attribute value byte 60. The remaining byte 64 is reserved. Table IV, below, lists the various attributes which may be selected for collection.

TABLE IV

| Number | Attribute Name |
| --- | --- |
| 0 | Not used |
| 1 | Raw Read Error |
| 2 | Throughout Performance |
| 3 | Spin-Up Time |
| 4 | Start/Stop Count |
| 5 | Re-Allocated Sector Count |
| 6 | Read ChannelMargin |
| 7 | Seek Error Rate |
| 8 | Seek Time Performance |
| 9 | Power-On Hours Count |
| 10 | Spin Retry Count |
| 11 | Drive Calibration Retry Count |
| 12 | Drive Power Cycle Count |
| 13–199 | Reserved Attributes |
| 200–255 | Vendor Unique Attributes |

It should be understood that the list of attributes set forth in Table IV is, by no means, intended to be a comprehensive listing of all possible attributes which may be selected for monitoring. For example, among the other attributes which may be selected for monitoring are sector reads, sector writes, total seeks, recovered read errors, hard write errors, recovered write errors, seek errors, data request (or "DRQ") timeouts, other timouts, recovery failed read errors, recovery failed write errors, format errors, power on self test (or "POST") errors, drive not ready errors and physical drive reallocation aborts.

Referring next to FIG. 5, the data structure for the warranty failure thresholds sector 22 in which the threshold values for the drive attributes stored in the drive attribute values sector 20 may now be seen. The warranty failure thresholds sector 22 includes a data structure revision number (or "rev. no.") 68 which identifies the version of the data structure implemented in the warranty failure thresholds sector 22. Initially, the data structure revision number 68 will be set to 0x0003 and incremented by one for each new revision. The warranty failure thresholds sector 22 further includes thirty drive thresholds 70-1 through 70-30, each of which will contain a saved threshold value for the corresponding attribute stored in the drive attribute sector 202-1 through 202-30. Preferably, threshold values stored in the warranty failure thresholds sector 22 should be arranged in the same order as the attribute values stored in the drive attribute values sector 20. Finally, the warranty failure thresholds sector 22 further includes a reserved region 72 for threshold values which correspond to future attributes, a region 74 reserved for threshold values corresponding to attributes unique to a single vendor and a checksum 76 for detecting errors during a write to the warranty failure threshold values sector 22.

Referring next to FIG. 6, the data structure for a warranty failure threshold value will now be described in greater detail. As each warranty failure threshold value 70-N corresponds to an attribute 202-N, attribute ID No. byte 78 uniquely identifies the particular attribute 202-N to which the warranty failure threshold value 70-N corresponds. Warranty failure threshold byte 80 contains the warranty failure threshold value which is compared with the normalized attribute value contained in the normalized attribute value byte 58 to determine whether the attribute 202-N has crossed its warranty failure threshold 70-N. Finally, the warranty failure threshold value 70-N contains a region 82 which is reserved for future uses.

Figures 9, 10:
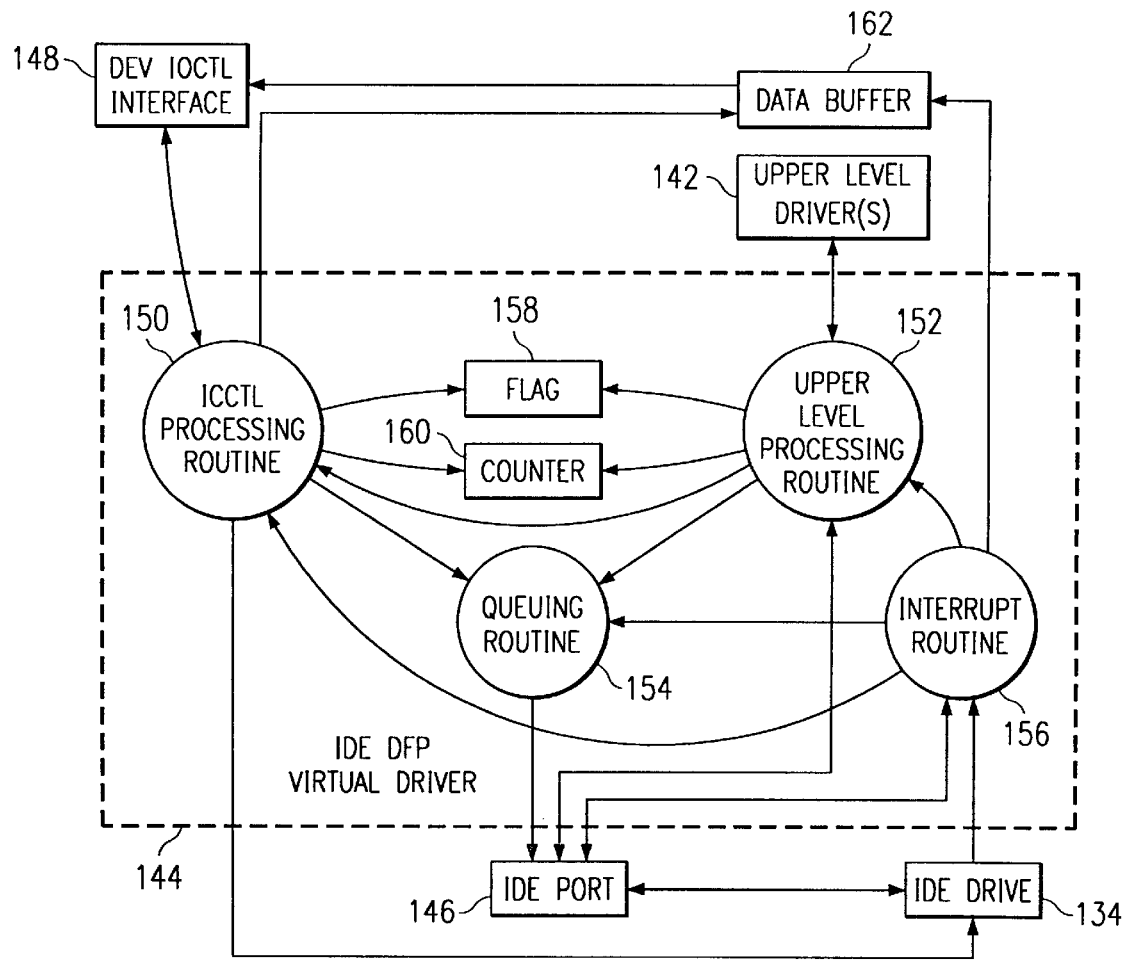
FIG. 9 is a block diagram of the IDE DFP virtual driver of FIG. 8, which also illustrates the method by which the DFP application accesses the IDE port driver.
FIG. 10 is a block diagram of a data structure for the drive logging sector of FIG. 1.

Referring next to FIG. 10, there is illustrated a number of sectors comprising forming the logging sector 23. There are preferably two hundred fifty-six sectors that comprise the logging sector 23 and that are reserved for error log reporting. Each sector contains 512 bytes and may be read by the host 12 with a "Read Log Sector" command and written by a "Write Log Sector" command. An error log sector 280 is provided to log information about the storage device's 14 drive performance, errors and usage. A future error log extension 282 is reserved in sectors 02h–05h. A self-test log sector 284 is provided to store the result of the self-tests. Host specific logging sectors 286 are provided to store configuration information about the host computer 12, such as operating system, processor type and speed, amount of system memory, chipset or interface chips, date and time. Finally, sectors A0h–BFh are reserved for storage device vendor specific logging and sectors 00h, 07h–07Fh and C0h–FFh are reserved for future use.

Referring next to FIG. 11, there is illustrated a data structure for the self-test logging sector 284. Results of the self-tests are stored in the self-test logging sector 284. A data structure revision number 300 is provided to indicate the version of the self-test logging sector data structure. The self-test logging sector 284 further includes twenty-one descriptor entries 202-1 through 202-30, each of which will contain self-test results, such as a saved self-test number, self-test execution status, lift time power-on-hours, failure checkpoint, logical block address (LBA) of the first failure, and preferably fifteen vendor specific bytes. Preferably, the descriptor entries 202-1 through 202-30 should all be concatenated together directly after the data structure revision number 200. The descriptor entries preferably form a circular buffer that starts at byte 2 and ends at byte 482. For example, the $22^{nd}$ descriptor will overwrite the $1^{st}$ descriptor. Any unused descriptor is preferably filled with zeros. A vendor specific word 304 is provided. A self-test descriptor index pointer 306 is provided to hold a value preferably pointing to the most recent written descriptor in the self-test logging sector 284. If no errors have been found, the index pointer 306 is preferably filled with zeros. Finally, a number of bytes 308 are reserved for future use and a checksum 226 is provided for checking data validity and detecting errors during a read to the self-test logging sector 284.

Referring now to FIG. 12, there is illustrated a particular data structure of the self-test descriptor entry 284, identified as 302-N. The first entry is a self-test number 320 for identifying the particular self-test performed. The entry may contain one of a number of unique self-tests as defined by the storage device 14 vendor. A self-test execution status byte is provided to hold a self-test status execution value from the self-test performed, such as one of the ones listed in Table III. A life-time power on hour word 324 is provided to indicate the number of hours the storage device 14 has been powered on when the self-test was performed. A self-test failure checkpoint byte 326 is provided to hold an indication of at what point into the self-test the failure occurred. A LBA of $1^{st}$ failure double-word 328 is provided to hold a logical or linear sector address of the first failed sector. Finally, a vendor specific portion 330 is provided.

Referring next to FIGS. 7A–B, the method of predicting an imminent failure of an ATA disk drive or other storage device 12 will now be described in greater detail. The method commences at step 84 by powering-up or resetting the computer system 10. Proceeding to step 86, the host computer 12 checks as to whether drive failure prediction has been enabled as part of the power-on-self-test (or "POST") performed during power-up. Enablement of drive failure prediction is checked by reviewing the status of the enable/disable drive failure prediction flag maintained by the storage device 14.

If it is determined at step 86 that drive failure prediction has been enabled, the method proceeds to step 88 where the host computer 12 awaits a drive failure prediction command. If no drive failure prediction command is received, the method continues on to step 90 where the saved attribute values stored in the drive attribute values sector 20 of the storage device 14 are transferred to the volatile memory of the host computer 12 where they are stored as the current attribute values for the storage device 14. Also transferred to the volatile memory of the host computer 12 at step 90 are the warranty failure threshold values stored in the warranty failure thresholds sector 22 of the storage device 14.

As previously stated, the contents of the current attribute values held in the volatile memory are periodically transferred to the storage device 14 where they are stored in the drive attribute values sector 20 as saved attribute values. Accordingly, at step 92, a timer which is set to time out upon expiration of a selected time period separating successive saves of the attribute values to the storage device 14 is set.

Proceeding to step 94, the host computer 12 monitors each of the selected attributes. More specifically, if the host computer 12 detects the occurrence of an activity within the storage device 14 which will affect one or more of the selected attributes, the host computer 12 will update the appropriate current attribute value stored in the volatile memory of the host computer 12. For example, if the occurrence of a seek error during a read operation is detected, the current value of the seek error rate attribute stored in the volatile memory of the host computer 12 must be updated. Accordingly, if the host computer 12 detects the occurrence of an event related to a drive attribute selected for monitoring, the method proceeds to step 98 where the value of the appropriate drive attribute or attributes is updated by saving the updated drive attribute to the volatile memory.

Continuing on to step 100, if the timer has not yet timed out, i.e. the time period separating successive saves of the attribute values to the storage device 14 has not elapsed, the method returns to step 94 for further monitoring of the drive attributes during drive operations. Continuous monitoring of the storage device 14 and updating of attributes for which occurrences of events are detected is maintained until the timer times out, thereby indicating that the time period between successive saves of the drive attributes to the storage device 14 has elapsed.

Upon expiration of the time period between successive saves of the drive attributes, the method proceeds to step 102 where the current attribute values stored in the volatile memory of the host computer 12 are stored to the drive attribute values sector 20 of the storage device 14 as saved attribute values. Proceeding to step 104, a determination is made as to any of the saved attribute values require normalization. More specifically, normalization may be required if the raw attribute value bytes 62 were changed during the save of the current attribute values to the storage device 14 as saved attribute values.

If the raw attribute value bytes 62 were changed, the method proceeds to step 106 where the normalized attribute value byte 58 is revised if necessary. Normalization is a process by which the raw value of an attribute is given a relative weight for comparison with a threshold value. By normalizing the raw value of an attribute, the method avoids an instantaneous raw value from being improperly interpreted as an imminent failure. For example, if one read error occurs during the first ten read operations, the read error rate will exceed the read error rate threshold and a prediction of an imminent failure of the storage device 14 will be issued even though the storage device 14 could then subsequently execute 1 million additional read operations without error.

Generally, the normalization process must address three phenomena which occur during the data collection process and which may cause inaccuracies in the disclosed method of predicting imminent drive failures. These phenomena are data swamping, data spiking and statistical invalidity. Data swamping occurs when past data overshadows recent data, thereby masking an imminent failure. This problem may be solved by collecting data over a discrete range of samples. Data spikes occur when an attribute has a single departure from its normal operating range. Such spikes may cause a failure prediction even though no such failure is imminent. To avoid data spikes from causing errant failure predictions, several raw data points should be collected before normalizing the raw value of the attribute. Finally, statistical invalidity is a concern with respect to certain attributes, for example, the read error rate discussed above, which require that multiple samples be collected before an accurate calculation can be made.

It should be appreciated by one skilled in the art that characteristics of a given attribute may cause the normalization and statistical validity algorithm to differ from the normalization and statistical validity algorithm for others of the attributes. For example, for the spin-up retry attribute, the total number of spin-up retries which have occurred is stored in the raw attribute value byte 62. If 30 spin-up retries is selected as the warranty threshold value, then the equation set forth below may be used to calculate a normalized value for the spin-up retry count:

$$\text{spin-up retry count} = \frac{(\text{max spin retries} - \text{spin retry count})}{\text{max spin retries}} \times 100$$

where the max spin-up retries equals 30 and the spin-up retry count is accumulated by the drive over 200 spin-ups. Thus, if fifteen spin-up retries occurring per 200 spin-ups is considered to be indicative of a drive that is ready to fail, then the threshold for this attribute would be set to 50.

By normalizing the threshold values, potential misinterpretations of attribute raw counts as indicators of potential failures are avoided. It is specifically contemplated that the end points for all of the normalized attributes will be 1 and 100, although, for performance and error rate type attributes, values greater than 100 are possible.

After normalization of any saved updated attribute values requiring normalization is completed at step 106 or if it was determined at step 104 that none of the saved attribute values required normalization, the method proceeds to step 108 where a determination is made as to whether the normalized value of the attribute is the worst ever normalized value of that attribute by comparing the contents of the normalized attribute value byte 58 and the worst ever normalized attribute value byte 60. If the value of the normalized attribute value byte 58 is greater than the worst ever normalized attribute value byte 60, the worst ever normalized attribute value byte is updated at step 108 by writing the contents of normalized attribute value byte 58 to the worst ever normalized attribute value byte 60.

Proceeding on to step 112, the contents of the normalized attribute value byte 58 is compared to the contents of the warranty failure threshold byte 80 to determine whether the normalized attribute value has crossed the threshold value for that attribute. If it is determined at step 112 that the threshold has been crossed, the method proceeds to step 116 where an alert is generated, for example, by displaying a pop-up window on the display screen of the host computer 12 which contains a message alerting the operator to the imminent failure of the storage device 14. The operator may then use this information to take appropriate corrective action to minimize both data loss and down time. Having issued an alert as to the imminent failure of the storage device 14, the method of the present invention ends at step 118, for example, by the operator powering down the host computer 12 so that repairs may be initiated. It should be understood, however, that if the operator ignores the alert and continues to operate the host computer 12, the method would proceed to step 114 where the timer is reset and then return to step 94 where monitoring of the selected attributes would continue in the manner previously described as if no alert were generated. Alternately, if the operator responds to the alert by disabling drive failure prediction, the method would proceed to step 126, below.

Returning to step 112, if it is determined that the normalized attribute value has not crossed the threshold value for that attribute, the method proceeds to step 114 where the timer is reset and returns to step 94 where monitoring of the selected attributes would continue in the manner previously described.

Returning now to step 88, if the operator wishes to execute one of the drive failure prediction commands set forth in Table I, above, the operator places the desired drive failure prediction command in the command register 42 and the key into the cylinder low and cylinder high registers 36 and 38. If off-line data collection is desired, test number zero is additionally written into the sector number register 34. Proceeding to step 120, the storage device 42 examines the cylinder low and cylinder high registers 36 and 38 to determine if the key has been placed therein. If the key has been placed in the cylinder low and cylinder high registers 36 and 38, the method proceeds to step 122 where a selected one of the drive failure prediction commands set forth in Table I may be executed. If, however, the key has not been placed in the cylinder low and cylinder high registers 36 and 38, the method returns to step 88.

Proceeding to step 124, if the executed drive failure prediction command is the last command to be performed, the method returns to step 88. If, however, another drive failure prediction command is to be executed, the method returns to step 122 to perform the next requested drive failure prediction command.

Returning now to step 86, if it is determined that drive failure prediction is not enabled, the method proceeds to step 126 where self-preserving attributes are monitored in the same manner previously described with respect to all other attributes even though drive failure prediction is not enabled. The method of monitoring self-preserving attributes while drive failure prediction is disabled differs from that previously described with respect to the monitoring of all attributes when drive failure prediction is enabled only in that no alerts are generated in response to a self-preserving attribute crossing a warranty failure threshold. Proceeding to step 128, monitoring of the self-preserving attributes ends, for example, by powering down the computer or by enabling drive failure prediction, in which case the method would then proceed to step 88.

Figure 13A:
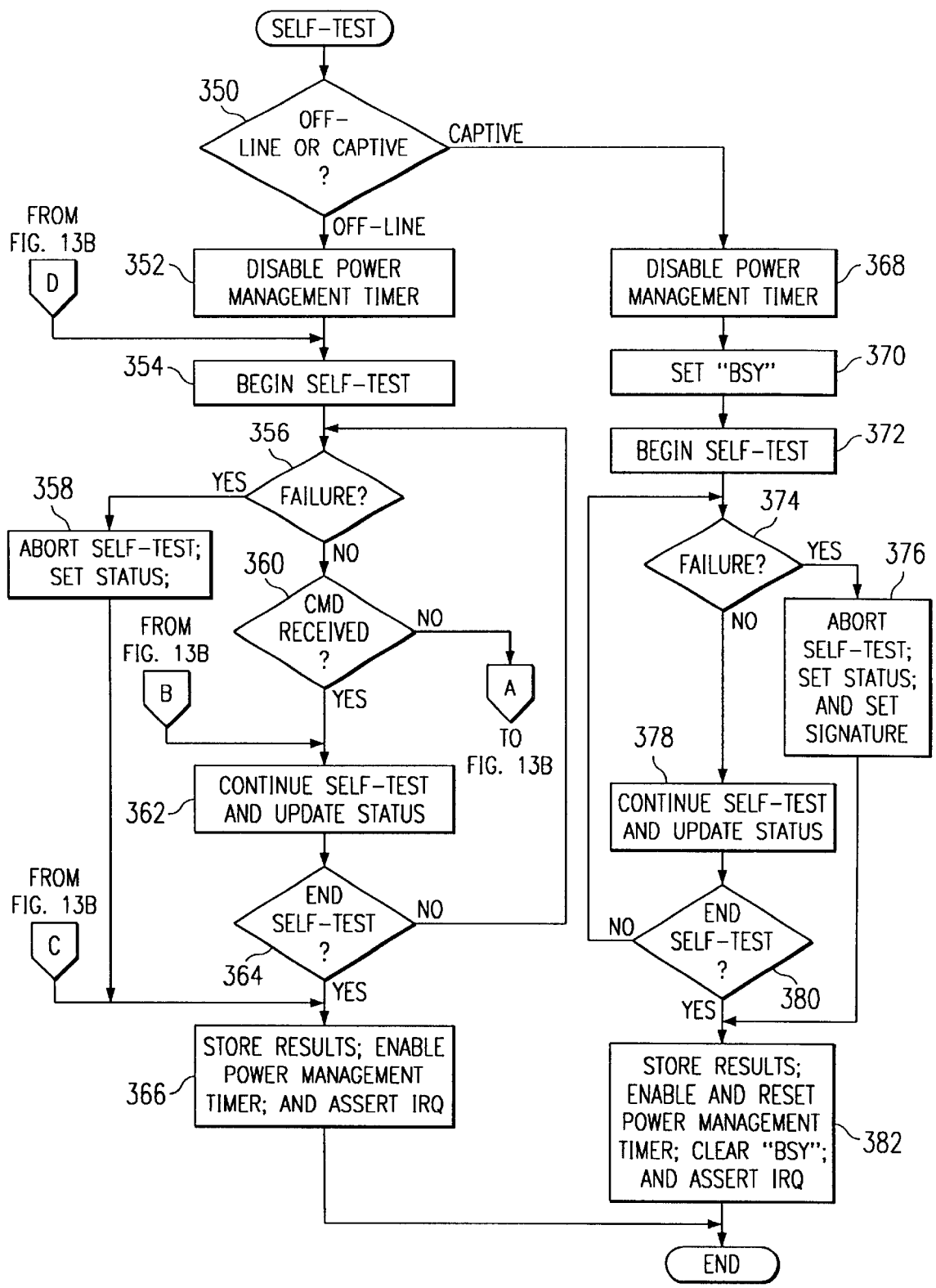

Referring next to FIG. 13A, there is illustrated a method of performing self-tests operations on the storage device 14, according to the preferred embodiment. The operation commences with an "Off-Line Immediate" command where one of the self-tests is identified in the sector number register 34. At step 350, the mode of operation of the self-test is determined by looking at the test number or the upper bit (CAP bit) in the sector number register 34. Test numbers 128–255 are designated captive mode tests. If the self-test is to be run in off-line mode, the method proceeds to step 352 where the power management is disabled. In particular, a power-down timer is disabled. The power-down timer may be disabled by disabling the clock, masking the output or any other method that disables a power-down event during the self-test.

Proceeding on to step 354, the self-test is initiated according to the self-test selected by the test number written into the sector number register 34. At step 356 and while the self-test is being performed, the method determines if a failure is detected during the self-test. If so, the method proceeds to step 358 to abort the self-test and set the self-test execution status flags. Anytime a failure occurs, the storage device 14 sets the ABRT bit in the error register 46 and the ERR bit in the status register 44. Processing continues from step 358 to step 366, described below.

If at step 356 it is determined that a failure has not occurred, the method proceeds to step 360 where the storage device 14 continues the self-test while monitoring for commands from the host. If a command is received, processing proceeds to step 384 discussed below. If a command has not been received, processing proceeds to step 362 to update the self-test execution status byte 206 and continue the self-test. Processing proceeds from step 362 to step 364 to determine if the self-test is complete. If not so, processing returns to step 356 where the self-test continues while failures and commands are further monitored.

If at step 364 it is determined that the self-test has completed, processing proceeds to step 366 to store the test results, enable power management and assert an interrupt to the host. The test results are stored in the self-test logging sector 284 according to the self-test descriptor 302-N described above. The self-test descriptor index pointer 306 and checksum 310 are also updated. The final status is recorded in the self-test execution status byte 322, which has the same values as described in Table III. The descriptors are written in a circular buffer so that the results from the most recent twenty-one self-tests are maintained with the self-test descriptor index pointer 306 indicating the most recent. Once the host 12 receives the interrupt, the host 12 may read the self-test logging sector 284 to read the results of the test. If a failure was detected in step 356, the self-test failure checkpoint byte 326 is written. If the failure is the first failure, the LBA of $1^{st}$ failure double-word 328 is written.

Returning to step 350, if it is determined that the self-test should be run in captive mode processing proceeds to step 368 where the power management is disabled as indicated above. Processing proceeds to step 370 to set BSY so that the storage device 1 is not accidentally interrupted by the host 12 during the captive self-test. Processing proceeds to step 372 to initiate the self-test according to the self-test selected by the test number written into the sector number register 34. While the self-test is being performed, the storage device 14 monitors for failures at step 374.

If a failure is detected, the method proceeds to step 376 to abort the self-test, set the self-test execution status flags and write a unique signature into the cylinder high 38 and cylinder low 36 registers. Preferably, the unique signature is indicated by a F4h in the cylinder high 38 register and a 2Ch in the cylinder low 36 register. Anytime a failure occurs, the storage device 14 sets the ABRT bit in the error register 46 and the ERR bit in the status register 44.

If at step 374 it is determined that a failure has not occurred, the method proceeds to step 378 to update the self-test execution status byte 206 and continue the self-test. Processing proceeds from step 378 to step 380 to determine if the self-test is complete. If not so, processing returns to step 374 where the self-test continues.

If at step 364 it is determined that the self-test is complete, processing proceeds to step 382 to store the test results, enable power management, reset the power-down timer, clear BSY, and assert an interrupt to the host. The test results are stored according to the logging sector 284 and as described in step 366. Step 366 and step 364 are similar except that step 364 resets the power-down timer.

Returning to step 360, if in off-line mode it is determined that a command is received from the host 12, processing continues to step 384 (FIG. 13B) to query the command. If the command is a "Disable Operations" or "Off-line Immediate" or "Stop Self-test" or "Standby Immediate" command, at step 386 the self-test is aborted and the new command is executed. The storage device 14 sets the ABRT bit in the error register 46 and sets the self-test execution status byte to indicate that the self-test was stopped by the host 12. After execution of the new command, the self-test is preferably not resumed. Processing continues to step 366 to store any results, enable power management and assert an interrupt. Preferably the self-test is terminated and the command is serviced within two seconds of receipt by the storage device 14.

If at step 384 it is determined that one of the above enumerated commands was not received, the method proceeds to step 388 to determine if the command is another "Start Self-test" command. If so, the current self-test is aborted at step 390 and processing returns to step 354 to restart the self-test previously requested.

If at step 388 it is determined that a "Start Self-Test" command has not been received, then processing continues to step 392 to suspend the self-test and service the newly received command. Preferably the self-test is suspended and the command is serviced within two seconds of receipt by the storage device 14. After servicing the command from the host 12, processing continues to step 362 to resume the self-test activity.

Thus, there has been described a storage device 14 operable to perform diagnostic self-tests on itself. The principled described herein are applicable to ATA, SCSI, SCA and other types of drive interfaces.

Referring next to FIG. 8, the interface between a DFP application 136 and an IDE drive 134 in a Windows 95 operating system will now be described in greater detail. Windows 95 uses a layered block device driver architecture 138, a collection of 32-bit, flat model device drivers, to manage input/output (or "I/O") operations with block devices, i.e., exchanges between applications 132-1 through 132-N and the IDE drive 134. The layered block device driver architecture 138 consists of dynamically-loadable virtual device drivers configured to include a plurality of layers, typically between 3 and 5. Each layer has a specified level of functionality and a driver belonging in that layer must have the specified functionality.

The uppermost level of the layered block device driver 138 contains the file system driver 140. The file system driver 140 manages high-level I/O requests from the applications 132-1 through 132-N. Beneath the file system driver 140 are one or more upper level driver(s) 142, the exact number of which will vary based upon the configuration of the layered block device drivers 138. Typically, the upper level driver(s) 142 will carry out functions which include transitions of I/O requests from a volume orientation to a logical device orientation, from a logical device to a physical device orientation and from a physical device orientation to an adapter orientation. Drivers at higher levels generally deal with logical I/O operations while drivers at lower levels carry out physical I/O to adapters. Beneath the upper level driver(s) 142 in the call-down stack is the IDE DFP virtual driver 144. As will be more fully described later, the IDE DFP virtual driver directs accesses from the various Windows 95 applications 132-1 through 132-N via the file system driver 140 and accesses from the DFP application 136 via the DEV IOCTL interface 148 directly to the IDE drive 134 while replies from the IDE drive 134 are selectively directed to either the DEV IOCTL interface 148 (if their destination is the DFP application 136) or the upper level driver(s) 140 if their destination is elsewhere, for example, a selected one of the applications 132-1 through 132-N. The IDE DFP virtual driver 144 also monitors every command sent to the IDE port driver 146 from the file system driver 140 and records its completion. Thus, when an IDE command is sent to the IDE DFP virtual driver 144 from the file system driver 140, the command is passed to the IDE port driver 146 and a count of the total number of pending commands is incremented. Conversely, when a reply to the IDE command sent from the file system driver 140 is returned by the IDE port driver 146, the count of the total number of pending commands is decremented. When a DFP command is received from the DFP application 136, the IDE DFP virtual driver 144 will queue any later IDE commands from the file system driver 140 until a reply is received. If, however, an IDE command sent from the file system driver 140 is pending when the DFP command is received, the DFP command will be queued until replies to all of the pending IDE commands are received.

Beneath the IDE DFP driver 144 is IDE port driver 146. The IDE port driver 146 transmits accesses received from the IDE DFP driver 144 originating at the one of the applications 132-1 through 132-N to the IDE drive 134 and, in conjunction with the IDE DFP driver 146, handles interrupts and attends to processing returns to the applications 132-1 through 132-N.

Referring next to FIG. 9, the IDE DFP virtual driver 144 will now be described in greater detail and the method by which it processes commands from the various applications 132-1 through 132-N and 136 residing on the platform 131 of the computer system 10 will now be described in greater detail. As may now be seen, the IDE DFP virtual driver 144 includes plural routines, each of which handle selected portions of I/O exchanges between either the file system driver 140 or the DFP application 136 and IDE drive 134. These routines include an IOCTL processing routine for handling the transfer of requests received from the DEV IOCTL interface 148 to the IDE drive 134, an upper level processing routine for handling the transfer of requests received from the upper level driver(s) 142 to the IDE port driver 146 and the transfer of replies from the IDE port driver 146 to the upper level driver(s) 142, a queuing routine 154 for queuing received from the upper level driver(s) during processing of requests from the DEV IOCTL interface 148 and an interrupt routine 156 which handles the return of replies from the IDE drive 134 to the DEV IOCTL interface while returning replies from the IDE drive 134 to the upper level driver(s) 142 to the IDE port driver 146 for re-routing to the upper level processing routine 152.

Continuing to refer to FIG. 9, the process by which the IDE DFP virtual driver 144 handles the exchange of messages between the DFP application 136 and the IDE drive 134 and between the file system driver 140 and the IDE drive 134 will now be described in greater detail. The file system driver 140 initiates a request to the IDE drive 134 by placing the request in the upper level driver(s) 142. In turn, the upper level driver(s) 142 transfers the request file to the upper level processing routine 152. The upper level processing routine first checks to see if the DFP application 136 is active, i.e., whether the IDE drive 134 is handling a DFP request, by checking flag 158. If the flag 158 is not asserted, the DFP application 136 is not using the IDE drive 134. The upper level request routine 152 would then increment counter 160 by one and send the request to the IDE port driver 146.

If, however, when the upper level processing routine 152 checks the flag 158 and the flag 158 is asserted, this indicates to the upper level processing routine 152 that the DFP application 136 is active, i.e., the IDE drive 134 is handling a DFP request. If so, the upper level request routine 152 would increment the counter 160 and send the request to the queuing routine 154 where the request would be queued until the queuing routine 154 is notified that the DFP application 136 has released the IDE drive 134. The queuing routine 154 would then deliver the queued requests to the IDE port driver 146 in the queued order.

To initiate an access of the IDE drive 134, the DFP application 136 transfers a request to the DEV IOCTL interface 148. In turn, the DEV IOCTL interface 148 would make an inquiry to the IOCTL processing routine 150 as to whether the file system driver 140 has reserved the IDE drive 134. Upon receipt of an inquiry from the DEV IOCTL interface 148, the IOCTL processing routine 150 checks the counter 160. If the counter 160 is set to zero, there are no pending requests from the file system driver 140. If there are no pending requests from the file system driver 140, the IOCTL processing routine 150 will reserve the IDE drive 134 for the DFP application 136 by setting the flag 158. The IOCTL processing routine 150 then issues a reply to the DEV IOCTL interface 148 which indicates that the IDE drive 134 has been reserved for the DFP application 136. The DEV IOCTL interface 148 would then transmit the request to the IDE drive 134.

If, when the IOCTL processing routine 150 checks the counter 160 and the counter is not set to zero, the IDE drive 134 has already been reserved by the file system driver 140. If so, the IOCTL processing routine 150 would set the flag 158 and block the request from DEV IOCTL interface 148. Requests from the DFP application 136 would be blocked by the IOCTL processing routine 150 until the upper level processing routine 152 has decremented the counter 160 to zero, thereby indicating that the file system driver 140 has released the IDE drive 134. Upon being notified by the IOCTL processing routine 150 that the file system driver 140 has released the IDE drive 134, the DEV IOCTL interface 148 would then unblock and deliver the previously blocked DFP requests to the IDE drive 134 in the order received.

When the IDE drive 134 wishes to reply to a request issued by either the DFP application 136 or the file system driver 140, the IDE drive 134 issues a common interrupt to the interrupt routine 156. As the interrupts generated by the IDE drive 134 are shared, i.e., may relate to requests from either the file system driver 140 or the DFP application 136, the interrupt routine 156 must then discern whether the interrupt is related to a request issued by the DFP application 136 or the file system driver 140. The use of shared interrupts is well known in the art and various techniques by which the interrupt routine 156 may discern the interrupt may be utilized. For example, the interrupt routine 156 may be provided with access to the flag 158. Upon receipt of the shared interrupt, the interrupt routine 156 may check the contents of the flag 158 and, if the flag is enabled, determine that the received interrupt relates to a request issued by the DFP application 136 and, if the flag is disabled, determine that the received interrupt relates to a request issued by the file system driver 140.

If the interrupt routine 156 determines that the received interrupt relates to a request from the DFP application 136, the interrupt routine 156 then arranges for the transfer of information to a data buffer 162 provided by the DFP application 136 and notifies the IOCTL processing routine 150 that DFP information has been placed in the data buffer 162. The IOCTL processing routine then attends to the transfer of control to the DEV IOCTL interface 148, resets the flag 158 to release the reservation of the IDE DFP virtual driver 144 by the DFP application 136 and informs the queuing routine 154 that any queued messages received from the upper level driver(s) may now be transferred to the IDE port driver 146.

If, on the other hand, the interrupt routine 156 determines that the received interrupt relates to a request from the file system driver 140, the interrupt routine 156 routes the interrupt to the IDE port driver 146. The IDE port driver 146 would then arrange for the transfer of information relating to a request by the file system driver 140 back to the file system driver 140. Specifically, the IDE port driver 146 will transfer the file system driver information to the upper level processing routine 152. In turn, the upper level processing routine 152 will decrement the counter 160 by one and transfer the file system driver information to the upper level driver(s) 142. If the counter 160 is decremented back to zero, all messages received from the upper level driver(s) have been processed. By decrementing the counter 160 to zero, the upper level driver(s) 142 reservation of the IDE drive 134 has been released. The upper level processing routine 152 would then notify the IOCTL processing routine 150 that any commands issued by the DFP application 136 which have been blocked by the DEV IOCTL interface 148 may be transferred to the IDE drive 134.

Thus, there has been described and illustrated herein, a storage device operable to perform diagnostics self-tests and a method for performing diagnostic self-tests with a storage device. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of testing a storage device having an industry-standard interface, components and a non-volatile memory, the method comprising:

receiving a test command via the industry-standard interface from a host computer;

the storage device performing a test on one or more of the components according to the test command;

the storage device identifying the failed component and a corresponding failure checkpoint of the test being performed, if a failure is detected by the storage device; and said storage device providing a pass/fail indication to the host and storing results from said test in the non-volatile memory, said results including the failed component identification and the failure checkpoint if a failure was detected.

2. The method of claim 1, further comprising:

before performing the test, determining if the test should be performed in an off-line or captive mode based on the test command; and setting a busy flag if the test should be performed in captive mode.

3. The method of claim 2, wherein the results includes a failure signature if a failure is detected while performing the test in captive mode.

4. The method of claim 2, wherein if the test should be run in off-line mode the method further comprises:

monitoring for a new command from the host computer while performing the test;

aborting the test if the new command is one of a disable operations command, an execute immediate command, a stop self test command and a standby immediate command; and aborting the test and starting a new test if the new command is a start self-test command.

5. The method of claim 4, wherein if the new command is not one of a disable operations command, an execute immediate command, a stop self test command, a standby immediate command, and a self-test command, the method further comprises:

suspending the test;

executing the new command after suspending the test; and resuming the test after executing the new command.

6. The method of claim 1, further comprising:

disabling power management before performing the test; and enabling power management after performing the test.

7. The method of claim 1, wherein the tests include a quick test and a comprehensive test.

8. The method of claim 1, wherein the non-volatile memory is a sector of the storage device.

9. The method of claim 1, wherein the results storing step further includes:

storing a test number, status indication and checksum; and updating an index pointer to point to a most recent results entry.

10. The method of claim 1, wherein the test includes a write test, servo test and a read scan test.

11. The method of claim 1, wherein the industry-standard interface is an IDE interface.

12. The method of claim 1, wherein the industry-standard interface is a SCSI interface.

13. A storage device having an industry-standard interface, comprising:

a non-volatile memory; and a controller coupled to said non-volatile memory, said controller operable to perform one or more self-tests in response to a test command received via the industry-standard interface from a host computer, the self-tests adapted to test components of the storage device, detect failures of the components, and store results of the tests in a logging descriptor of said non-volatile memory, each set of self-tests performed in response to the test command having a logging descriptor which is individually stored in said non-volatile memory, wherein if a failure is detected, the results include a failed component identification and a failure checkpoint, and wherein a certain number of descriptors are maintained in said non-volatile memory and said controller updates an index pointer to indicate a most recent logging descriptor entry.

14. The storage device of claim 13, wherein before performing the test said controller is further operable to determine if the test should be performed in an off-line or captive mode based on the test command, and wherein said controller sets a busy flag if the test should be performed in captive mode.

15. The storage device of claim 14, wherein the results include a failure signature if a failure is detected while performing the test in captive mode.

16. The storage device of claim 14, wherein if the test should be performed in off-line mode, the controller is further operable to monitor for a new command from the host computer while performing the test, abort the test if the new command is one of a disable operations command, an execute immediate command, a stop self test command and a standby immediate command, and abort the test and start a new test if the new command is a start self-test command.

17. The storage device of claim 16, wherein if the new command is not one of a disable operations command, an execute immediate command, a stop self test command, a standby immediate command, and a self-test command, the controller is further operable to suspend the test, service the new command after suspending the test, and resume the test after servicing the new command.

18. The storage device of claim 13,
wherein the controller is further operable to disable power management before performing the test, and
wherein the controller is further operable to enable power management after performing the test.

19. The storage device of claim 13, wherein the tests include a quick test and a comprehensive test.

20. The storage device of claim 13, wherein the non-volatile memory is a sector of the storage device.

21. The storage device of claim 13, wherein the logging descriptor further includes a test number, status indication and checksum.

22. The storage device of claim 13, wherein the tests includes a write test, servo test and a read scan test.

23. The storage device of claim 13, wherein the industry-standard interface is an IDE interface.

24. The storage device of claim 13, wherein the industry-standard interface is a SCSI interface.

25. A computer system, comprising:
a central processing unit including memory; and
a storage device having an industry-standard interface and being coupled to said central processing unit via the industry-standard interface, including:
    a non-volatile memory; and
    a controller coupled to said non-volatile memory, said controller operable to perform one or more self-tests in response to a test command received via the industry-standard interface from said central processing unit and, the self-tests adapted to test components of the storage device, detect failures of the components, and log results of the tests in said non-volatile memory,
wherein if a failure is detected, the results include a failed component identification, a failure checkpoint and system configuration information.

26. The computer system of claim 25,
wherein before performing the test said controller is further operable to determine if the test should be performed in an off-line or captive mode based on the test command, and
wherein said controller sets a busy flag if the test should be performed in captive mode to prevent the central processing unit from interrupting the test.

27. The computer system of claim 26, wherein the results include a failure signature if a failure is detected while performing the test in captive mode.

28. The computer system of claim 26,
wherein if the test should be performed in off-line mode, the controller is further operable to monitor for a new command from the central processing unit while performing the test, abort the test if the new command is one of a disable operations command, an execute immediate command, a stop self test command and a standby immediate command, and abort the test and start a new test if the new command is a start self-test command.

29. The computer system of claim 28, wherein if the new command is not one of a disable operations command, an execute immediate command, a stop self test command, a standby immediate command, and a self-test command, the controller is further operable to suspend the test, service the new command after suspending the test, and resume the test after servicing the new command.

30. The computer system of claim 25,
wherein the controller is further operable to disable power management before performing the test, and
wherein the controller is further operable to enable power management after performing the test.

31. The computer system of claim 25, wherein the tests include a quick test and a comprehensive test.

32. The computer system of claim 25, wherein the non-volatile memory is a sector of the storage device.

33. The computer system of claim 25, wherein the logging descriptor further includes a test number, status indication and checksum.

34. The computer system of claim 25, wherein the tests includes a write test, servo test and a read scan test.

35. The computer system of claim 25, wherein the industry-standard interface is an IDE interface.

36. The computer system of claim 25, wherein the industry-standard interface is a SCSI interface.

* * * * *